United States Patent
Iwasaki et al.

(10) Patent No.: US 6,621,487 B2
(45) Date of Patent: Sep. 16, 2003

(54) CIRCUIT FOR GENERATING TOUCH DETECTION SIGNALS, LOCATOR DEVICE AND A METHOD OF GENERATING TOUCH DETECTION SIGNALS

(75) Inventors: Mitsuharu Iwasaki, Kyoto (JP); Takashi Nagai, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 147 days.

(21) Appl. No.: 09/907,742

(22) Filed: Jul. 19, 2001

(65) Prior Publication Data
US 2002/0011991 A1 Jan. 31, 2002

(30) Foreign Application Priority Data
Jul. 25, 2000 (JP) .................... 2000-223902

(51) Int. Cl.[7] ............................................. G09G 5/00
(52) U.S. Cl. ....................................... 345/173
(58) Field of Search ............... 345/173–174; 178/18.01, 18.06

(56) References Cited

U.S. PATENT DOCUMENTS
5,565,658 A * 10/1996 Gerpheide et al. ....... 178/18.02

FOREIGN PATENT DOCUMENTS
JP 10-233670 9/1998

* cited by examiner

*Primary Examiner*—Richard Hjerpe
*Assistant Examiner*—Francis Nguyen
(74) *Attorney, Agent, or Firm*—Mattingly, Stanger & Malur, P.C.

(57) ABSTRACT

The input capacitance of a current outputting amplifier for the case where it is connected to an electrostatic sensor portion is preliminarily allowed for and after a capacitance equivalent to this input capacitance is added to the input terminal of the amplifier, an offset in the output of the amplifier is cancelled. The added capacitance is then isolated from the input terminal of the amplifier and electrodes in the electrostatic sensor portion are scanned to generate touch detection signals.

15 Claims, 2 Drawing Sheets

US 6,621,487 B2

CIRCUIT FOR GENERATING TOUCH DETECTION SIGNALS, LOCATOR DEVICE AND A METHOD OF GENERATING TOUCH DETECTION SIGNALS

BACKGROUND OF THE INVENTION

This invention relates to a circuit for generating touch detection signals and a locator device. More particularly, the invention relates to a locator device of such a type that a pair of electrodes in a grid pattern are scanned as a pair of capacitors whereby a touch detection signal having two peaks, one being greater and the other smaller than a specified reference level, is generated as a detection signal for the area around the touched electrode and its position is detected on the basis of this detection signal, characterized in that erroneous touch detection can be prevented by reducing or suppressing the variations in the offset of an electric current from the current outputting circuit which generates touch detection signals. The invention also relates to a circuit and a method for generating such touch detection signals.

The locator device is used as a substitute pointing device for the mouse, track ball and quick pointer on a computer system. It has a an electrostatic sensor portion comprising multiple X and Y electrodes arranged in a grid pattern and the position of a touched electrode is detected by sensing the difference in capacitance between adjacent electrodes in pair. For detecting the position of the touched electrode, X or Y electrodes are scanned, usually with a pair of adjacent electrodes taken as a set. The difference in capacitance between two capacitors formed by a pair of electrodes is detected as a difference in charge current by means of a charge current detector circuit and output as a touch detection signal.

If the X and Y electrodes in the electrostatic sensor portion are stripe electrodes thinner than the width of a finger which touches them, the capacitance of the touched electrode decreases because the electric lines of force between X or Y electrodes are interrupted by the finger. As a result, there occurs a change in the difference of capacitance between the touched electrode and the adjacent one which is either upstream or downstream of it. The difference in capacitance is positive and increases in the area upstream of the touched electrode. The difference then decreases and becomes zero in the touch position of the finger (its center portion) and thereafter increases taking a negative value. The difference then decreases to become zero again. This is the characteristic of the touch detection signal detected with the charge current detector circuit in the locator device. Briefly, the touch detection signal obtained by scanning X or Y electrode pairs with the charge current detector circuit varies in the scan direction such that two peaks occur with reference to a specified level, one being greater and the other smaller.

The touch detection signal generally described above is generated by a circuit of the type shown in FIG. 2 which receives a charge current as obtained from each electrode. FIG. 2 is a block diagram primarily for a charge current detector circuit 10 in a locator device which generates touch detection signals. Indicated by 11 is the electrostatic sensor portion (touching portion) of the charge current detector circuit; 12 is a multiplexer; 13 is a pulse drive circuit consisting of an X-side drive circuit and a Y-side drive circuit; 14 is a connection switching circuit; 15 is a differential current generator circuit; 16a, 16b and 16c are switching circuits; 17 is an integrator circuit; 18 is a control circuit; and 19 is an offset cancelling circuit. The integrator circuit 17 consists of an integrating capacitor Cs and a parallel-connected switch circuit SW for resetting the electric charges that have built up in the capacitor Cs. In the case shown, connection switching circuit 14, differential current generator circuit 15 and switching circuits 16a, 16b and 16c make up the charge current detector circuit.

Switching circuits 16a and 16b are provided between multiplexer 12 and connection switching circuit 14 and as indicated by the one-long-and-one-short dashed line, switching circuits 16a and 16b and subsequent circuits including connection switching circuit 14 are assembled in an IC. Among these circuits, switching circuit 16c is provided between differential current generator circuit 15 and integrator circuit 17.

Electrostatic sensor portion 11 is a flat member which has multiple stripe X electrodes spaced in the X direction and multiple stripe Y electrodes spaced in the Y direction; these two electrode groups are provided in a face-to-face relationship and superposed one on the other with a dielectric resin spacer interposed.

Two adjacent electrodes of either X or Y group are successively selected as a pair and driven by pulses supplied from pulse drive circuit 13. The electrodes of the other group are supplied with a voltage of constant level. The two selected electrodes of either group correspond to two capacitors Ca and Cb (see FIG. 2) in relation to the electrodes of the other group. The difference between the capacitances of these two capacitors is output as a current value from differential current generator circuit 15.

If the stripe electrodes of either X or Y group are driven by pulses from the pulse drive circuit 13, a differential pulse of positive polarity (charging current pulse) is generated in response to the rise of the drive pulse and a differential pulse of negative polarity (discharging current pulse) is generated in response to the fall of the drive pulse. Connection switching circuit 14 is used to get these two kinds of differential pulse (charge current) to have the same polarity; to this end, the connection to the input terminal at the positive phase of differential current generator circuit 15 and the connection to the input terminal at the negative phase are interchanged immediately before the rise and fall of the drive pulse. As a result, connection switching circuit 14 adjusts these two kinds of current to have a single polarity (inverts the discharging current to have a positive polarity) and outputs them to differential current generator circuit 15. The timing signal necessary for this switching operation is supplied as a timing signal T from controller 18.

When two adjacent electrodes in the Y direction as selected by multiplexer 12 are supplied with a drive pulse P, said drive pulse P is applied at one end N of each of the capacitors Ca and Cb which form a common junction (suppose N is initially for X electrodes). The other ends Na and Nb of the selected capacitors Ca and Cb (Na and Nb are initially for Y electrodes) are supplied to the (+) and (−) phase inputs, respectively, of differential current generator circuit 15 via multiplexer 12 and connection switching circuit 14. Differential current generator circuit 15 is composed of a Gm amplifier (transconductance amplifier) and provided at the (+) phase terminal (positive phase input terminal) and the (−) phase terminal (inverse phase input terminal) with the voltage signals (for charge current) that were generated at the other ends Na and Nb, respectively, of capacitors Ca and Cb. The circuit 15 outputs a differential current value representing the potential difference between the two input signals. For details of the technology about the charge current detector circuit, see U.S. Pat. No. 6,075,520 issued to the same assignee.

Offset cancelling circuit 19 is operated under the control of control circuit 18. In the absence of any signal input to differential current generator circuit 15 before scanning of electrostatic sensor portion 11 starts, offset cancelling circuit 19 sets the output of differential current generator circuit 15 at a reference level and adjusts the resulting output current to the value "zero". Since the output of differential current generator circuit 15 is set to the reference level as a result of this offset cancelling operation, touch detection signals which vary along the scan direction in such a way that two peaks occur with reference to a specified level, one being greater and the other being smaller, can be obtained with high precision. Another reason for providing offset cancelling circuit 19 is to absorb variations in the reference level that occur between individual products.

To cancel the offset that may occur when no signal is input to differential current generator circuit 15, offset cancelling circuit 19 in the illustrated case is assumed to set the output voltage to Vcc/2 (Vcc is the supply voltage) and adjust the output current to zero. For offset cancelling, control circuit 18 turns switching circuit 16c on. Receiving the output signal from differential current generator circuit 15, offset cancelling circuit 19 adjusts the operating current and the like so that the output voltage is equal to Vcc/2 while the output current is zero. Switching circuits 16a and 16b remain in the initial off state, so that the input side of differential current generator circuit 15 is not connected to electrostatic sensor portion 11 and supplied with no signal.

Speaking of the current outputting Gm amplifier, it is a push-pull circuit having a current source serving as a current discharger provided upstream in the push circuit and another current source serving as a current sink provided downstream in the pull circuit. Therefore, as shown in FIG. 2, differential current generator circuit 15 has two variable current sources 15a and 15b, the first serving as the upstream current discharger and the second as the downstream current sink, and offset cancelling is performed by adjusting the current values of the two variable current sources.

After the offset cancelling, controller 18 turns switching circuits 16a and 16b on and under its control, X or Y electrodes are scanned, whereby differential current generator circuit 15 generates touch detection signals that vary with the scan direction.

A problem with the circuit configuration described above is that when electrostatic sensor portion 11 is scanned with multiplexer 12, connection to sensor portion 11 must be established by actuating control circuit 18 to turn switching circuits 16a and 16b on and the charge currents obtained by scanning have such values that they will flow toward the ground GND.

On the other hand, the capacitance between the ground and the input of differential current generator circuit 15 varies if it is connected to electrostatic sensor portion 11 which is outside the IC; as a result, the offset cancelling operation performed prior to scanning is affected to prevent complete offset cancelling. This is because the stray capacitance relative to the ground is added to the input of differential current generator circuit 15 upon connection of electrostatic sensor portion 11. Before connection of sensor portion 11, the capacitance between the ground and the input of differential current generator circuit 15 is no more than 1 pF but upon connection of sensor portion 11, it increases to as high as 30–50 pF.

This affects the offset cancelling already performed by offset cancelling circuit 19 and the setting of the reference level is no longer effective in generating precise touch detection signals. In addition, an offset in differential current generator circuit 15 shifts the reference level either upward or downward, thereby narrowing the dynamic range of detection signals having an upward peak and a downward peak that are produced from differential current generator circuit 15. As a result, it becomes difficult to determine whether a certain electrode has been touched by a finger and there occurs either erroneous detection of an untouched electrode or failure to detect a touched electrode. What is more, the position of the touched electrode cannot be detected correctly.

SUMMARY OF THE INVENTION

The present invention has been accomplished under these circumstances and has as an object providing a circuit for generating touch detection signals that can prevent erroneous detection of an untouched electrode or failure to detect a touched electrode by reducing or suppressing the variations in the current offset that occurs to a current outputting circuit which generates touch detection signals.

Another object of the invention is to provide a locator device that can prevent erroneous detection of an untouched electrode or failure to detect a touched electrode by reducing or suppressing the variations in the current offset that occurs to a current outputting circuit which generates touch detection signals.

Yet another object of the invention is to provide a method for generating touch detection signals that can prevent erroneous detection of an untouched electrode or failure to detect a touched electrode by reducing or suppressing the variations in the current offset that occurs to a current outputting circuit which generates touch detection signals.

The first object of the invention can be attained by a touch detection signal generating circuit which scans electrodes arranged in specified directions in an electrostatic sensor portion and receives a charge current obtained from each electrode to generate a detection signal that represents the touching of a specified electrode, said circuit further including an amplifier that is connected to the electrostatic sensor portion via a first switching circuit and which receives the charge current at the input terminal to generate the touch detection signal as an output current, an offset cancelling circuit which cancels an offset in the output of the amplifier by setting the output terminal of the amplifier at a specified reference level and adjusting the output current to substantially zero when the amplifier is supplied with no signal and a capacitance adding circuit which is provided between the first switching circuit and the input terminal of the amplifier and by which a capacitance equivalent to the input capacitance of input terminal of the amplifier for the case where it is connected to the electrostatic sensor portion by means of the first switching circuit is added to the input terminal of the amplifier via a second switching circuit, the offset cancelling circuit cancelling an offset in the amplifier output with the electrostatic sensor portion being disconnected from the amplifier by means of the first switching circuit and with the capacitance being added to the input terminal of the amplifier by means of the second switching circuit.

The third object of the invention can be attained by a method for generating touch detection signals, wherein after said electrostatic sensor portion is disconnected from said input terminal of said amplifier, a capacitance equivalent to the input capacitance of said amplifier for the case where said electrostatic sensor portion is connected to said input terminal is added to said input terminal, whereby said offset cancelling circuit cancels an offset in the output of said amplifier and thereafter said added capacitance is isolated from said input terminal and said electrostatic sensor portion is connected to said input terminal of said amplifier and thereafter said scanning of electrodes is performed to obtain said detection signal.

Thus, according to the invention, the input capacitance of the current outputting amplifier for the case where it is connected to the electrostatic sensor portion is preliminarily allowed for and after a capacitance equivalent to said input capacitance is added, the offset cancelling circuit is activated to cancel an offset in the output of the current outputting amplifier. Even if the added capacitance is subsequently isolated from said input terminal of the current outputting amplifier and if the electrostatic sensor portion having a similar capacitance relative to the ground is later connected, the offset cancelling realized by the offset cancelling circuit will be affected by only a suppressed degree. If electrodes are scanned under these conditions, precise touch detection signals are obtained at the output of the current outputting amplifier.

As a further advantage, the variations in the reference level for the touch detection signals that are obtained from the current outputting amplifier as electrodes are scanned can be sufficiently reduced or suppressed to expand their dynamic range.

As a result, the locator device according to the second aspect of the invention which uses the touch detection signal generating circuit provides greater ease in determining whether a specified electrode has been touched or not and this not only reduces erroneous detection of an untouched electrode and failure to detect a touched electrode but also allows for precise detection of the positional coordinates of the touched electrode.

DESCRIPTION OF THE PREFERRED EMBODIMENT

Figure 1:
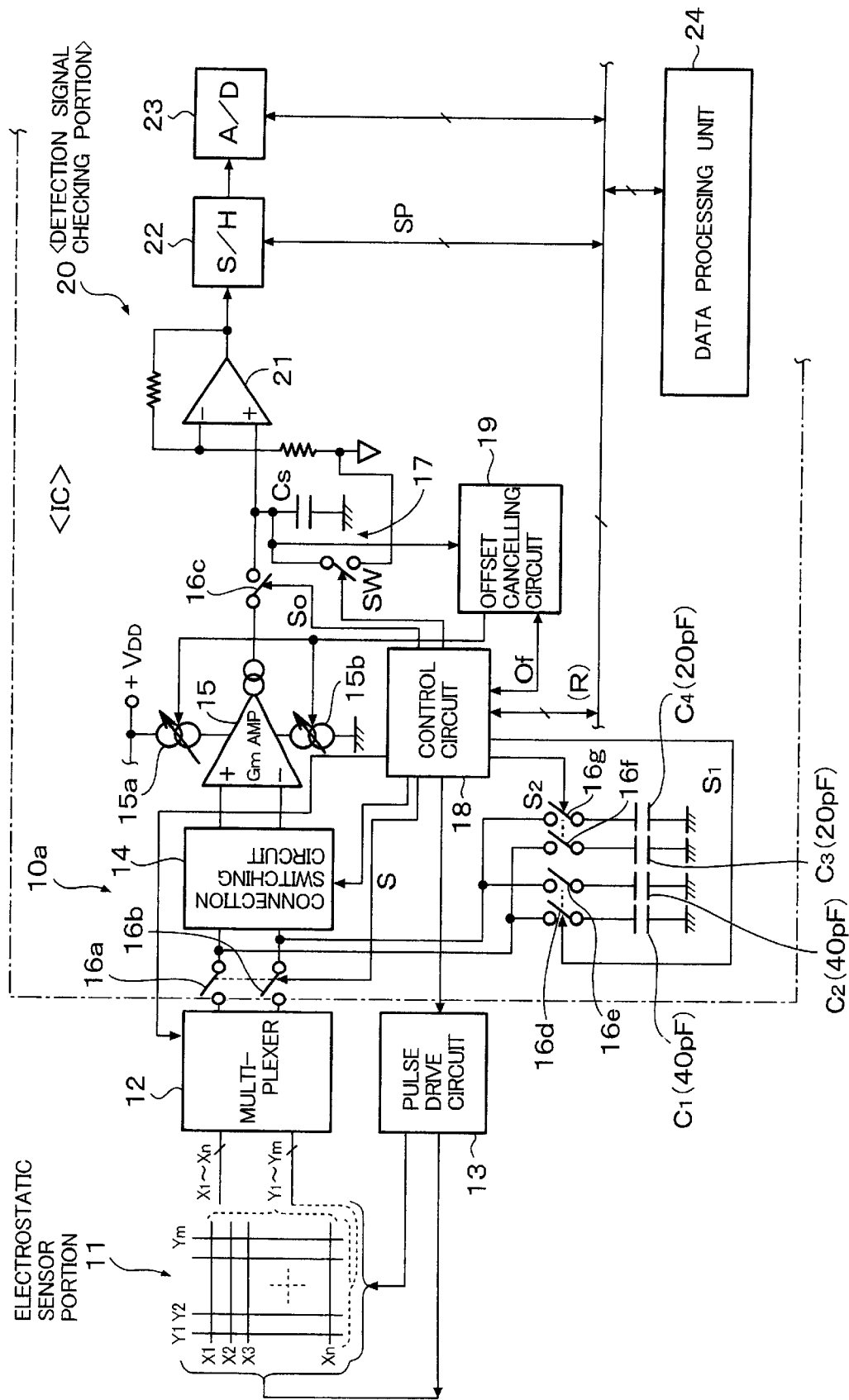
FIG. 1 is a block diagram primarily for the touch detection signal generating circuit in a locator device according to the second aspect of the invention.

Referring to FIG. 1, numeral 10a represents a charge current detector circuit in IC form. As shown, the input of a connection switching circuit 14 which is connected to the (+) phase input terminal of differential current detector circuit 15 is connected to capacitors $C_1$ and $C_3$ via switching circuits 16d and 16f, and the input of connection switching circuit 14 which is connected to the (−) phase input terminal of differential current detector circuit 15 is connected to capacitors $C_2$ and $C_4$ via switching circuits 16e and 16g. Each of these capacitors $C_1$–$C_4$ is connected between the associated input and the ground GND via the associated switching circuit. The capacitance adding circuit which is one of the characteristic components of the invention is composed of switching circuits 16d–16g and capacitors $C_1$–$C_4$.

Figure 2:
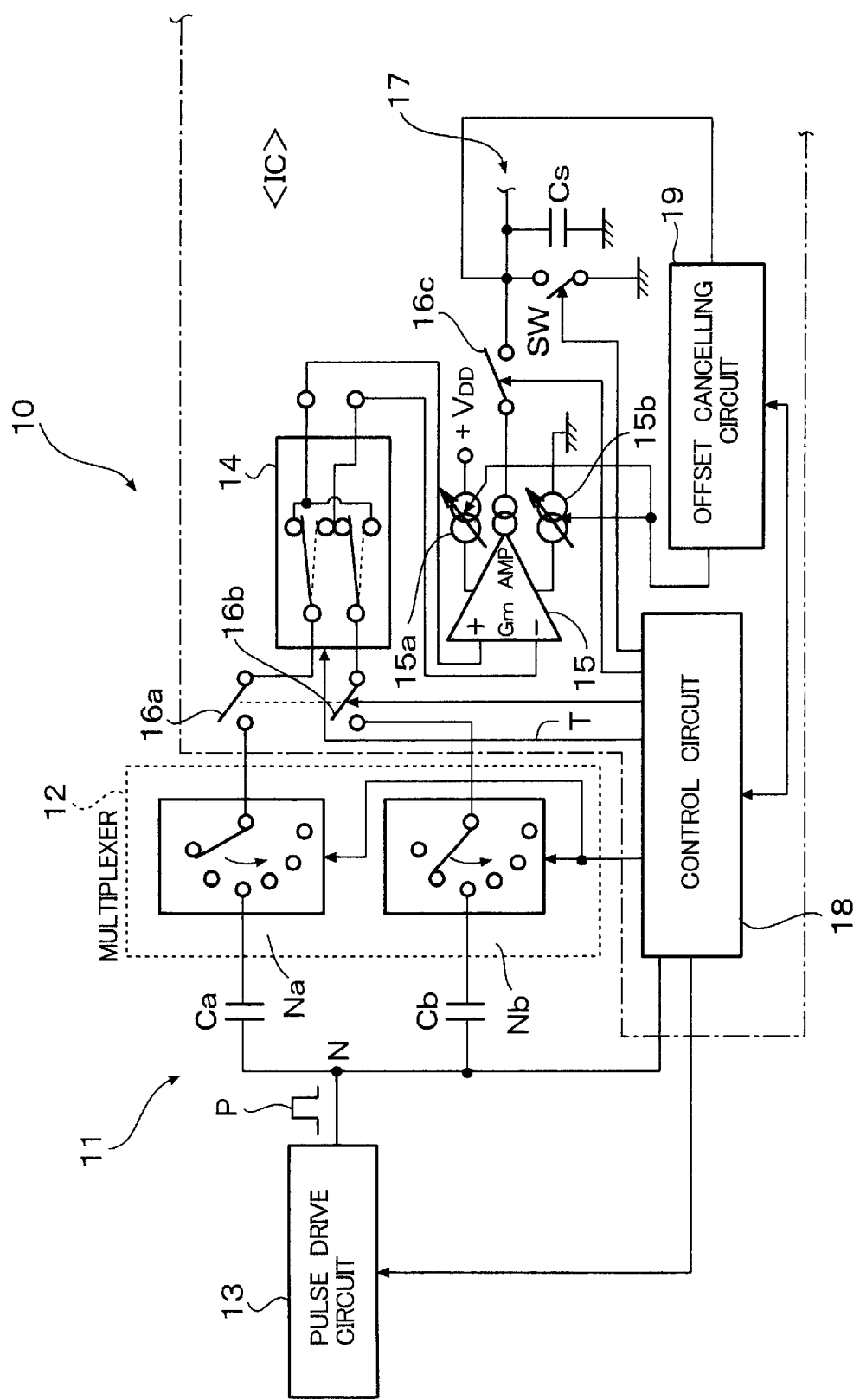
FIG. 2 is a block diagram primarily for the touch detection signal generating circuit in a conventional locator device.

In FIG. 1, the components which are identical to those shown in FIG. 2 are identified by like numerals and will not be described in detail. Indicated by 20 is a detection signal checking portion comprising an amplifier 21, a sample and hold (S/H) circuit 22, an A/D converter (A/D) circuit 23 and a data processing unit 24. Data processing unit 24 contains an MPU and a memory and, by program-controlled processing, determines whether a certain electrode has been touched and if it has, detects its position and the data on its positional coordinates is output to an external unit or circuit to which the locator device is connected.

In the locator device shown in FIG. 1, capacitors $C_1$, and $C_2$ have a capacitance of 40 pF and capacitors $C_3$ and $C_4$ have a capacitance of 20 pF. The capacitance of 40 pF is an average value for the stray capacitance relative to the ground of each input of differential current generator circuit 15 for the case where it is connected to electrostatic sensor portion 11. If switching circuits 16d and 16e are turned on so that capacitors $C_1$, and $C_2$ are connected parallel to the (+) and (−) inputs of differential current detector circuit 15, the sum capacitance is 80 pF. Capacitors of such small capacitance including capacitors $C_3$ and $C_4$ can be formed as part of an IC.

In order for offset cancelling circuit 19 to perform offset cancelling, namely, for setting the output of differential current generator circuit 15 at the reference level (current value=zero when the voltage is Vcc/2), control circuit 18 sends control signals $S_1$ and $S_2$ to turn switching circuits 16d and 16e on or turn switching circuits 16f and 16g on or turn all switching circuits 16d–16g on so that an offset in the output of differential current generator circuit 15 is cancelled by offset cancelling circuit 19. Thereafter, control circuit 18 turns switching circuits 16d–16g off but turns switching circuits 16a and 16b on, whereupon electrostatic sensor portion 11 is connected to the input of differential current detector circuit 15 via connection switching circuit 14 and the scanning operation is started to produce a touch detection signal is produced at the output of differential current detector circuit 15.

The sequence of steps in the offset cancelling operation are specifically described below. Before electrostatic sensor portion 11 is scanned, switching circuits 16a and 16b are off (they are initially off). Control circuit 18 sends control signals $S_0$ and $S_1$ to turn switching circuit 16c on and turn switching circuits 16d and 16e on (but turn switching circuits 16f and 16g off); at the same time, it sends a control signal Of to activate offset cancelling circuit 19. As a result, the capacitance (40 pF) of each of capacitors $C_1$ and $C_2$ is added to the input of connection switching circuit 14; in other words, said capacitance is added to the (+) and (−) phase input terminals of differential current generator circuit 15. In this state, offset cancelling circuit 19 adjusts the currents from variable current sources 15a and 15b in differential current generator circuit 15 to cancel an offset in the output of the latter. As a result, the output voltage of differential current generator circuit 15 is set at Vcc/2 (reference level) and its output current at the value "zero".

When the offset cancelling step ends, control circuit 18 stops sending control signal $S_1$ and sending control signal Of, turns switching circuits 16d and 16e off (also turns switching circuits 16f and 16g off), sends control signals S and $S_0$ and turns switching circuits 16a, 16b and 16c on to start scanning of electrostatic sensor portion 11. For each pair of electrodes being scanned, switching circuit 16c is controlled by control circuit 18 to remain on for a time period corresponding to 16 drive pulses P. Therefore, capacitor Cs in integrator circuit 17 is supplied with a current corresponding to approximately 32 pulses since the current is generated at the rise and fall of each drive pulse P. The supplied current charges capacitor Cs. The terminal voltage value which develops in capacitor Cs as the result of this charging is amplified by amplifier 21 in detection signal checking portion 20 and applied to sample and hold (S/H) circuit 22, where it is sampled by a sampling signal SP from control circuit 18. The sampled value is input to A/D converter 23, where a detection signal for each electrode pair corresponding to the scan position is converted to a digital value which, in turn, is input to data processing unit 24. Switching circuits 16a, 16b and 16c may be turned on for a longer period corresponding to more than 16 drive pulses P; for example, a suitable ON period may be selected from the range corresponding up to about 30 drive pulses. In the next step, switching circuit 16c is turned off (but switching circuits 16a and 16b remain on) and switching circuit SW is turned on to reset integrating capacitor Cs. Thereafter, switching circuit SW is turned off and switching circuit 16c is turned on so that the next electrode pair is scanned and subjected to the same detection procedure as described above.

Data processing unit 24 determines whether a certain electrode has been touched on the basis of the touch detection signal obtained by scanning each electrode pair and detects the position of any touched electrode; these steps are performed by the MPU which executes a specified program. If the answer to the question if any electrode has been touched is negative or if the position of the touched electrode cannot be detected, data processing unit 24 supplies controller 18 with a control signal R for instructing rescan of electrostatic sensor portion 11.

The specific procedures by which data processing unit 24 determines if a certain electrode has been touched and detects the position of any touched electrode are already known by being disclosed in Unexamined Published Japanese Patent Application No. 233670/1998.

In response to the issuance of rescan signal R, controller 18 stops sending control signal S, turns switching circuits 16a and 16b off, and sends control signals $S_0$, $S_1$ and $S_2$ to turn on not only switching circuits 16d and 16e but also switching circuits 16f and 16g so that offset cancelling circuit 19 is activated. In this case, capacitors $C_1$–$C_4$ are connected parallel and a capacitance of 60 pF is connected to each of the (+) and (−) phase inputs of differential current generator circuit 15 via connection switching circuit 14; thus, a total of 120 pF is connected to the inputs of differential current generator circuit 15. With 60 pF being connected to each of the (+) and (−) phase inputs of differential current generator circuit 15, offset cancelling circuit 19 cancels an offset in the output of differential current generator circuit 15.

After the offset is cancelled, controller 18 turns switching circuits 16d–16g off and as in the case just described above, turns switching circuits 16a, 16b and 16c on to start scanning of electrostatic sensor portion 11. Then, touch detection signals are similarly obtained and input to data processing unit 24 which performs the same checking operation as described above.

If the answer to the question if any electrode has been touched is again negative or if the position of the touched electrode cannot be detected, data processing unit 24 supplies controller 18 with a control signal R for instructing rescan of electrostatic sensor portion 11. In this case, both switching circuits 16f and 16g are turned on (but switching circuits 16d and 16e are turned off) and a capacitance of 20 pF is added to each of the (+) and (−) phase inputs of differential current generator circuit 15, whereupon the same procedure as described above is repeated.

In this way, offset cancelling circuit 19 can cancel an offset in the output of differential current generator circuit 15 before it is actually connected to electrostatic sensor portion 11 but with the input capacitance being nearly the same as that for the case where electrostatic sensor portion 11 is connected to differential current generator circuit 15. As a result, even if differential current generator circuit 15 is connected to electrostatic sensor portion 11 to scan electrodes, there is little or no fluctuation in the reference level of the touch detection signal being output from differential current generator circuit 15 and one can generate correct touch detection signals. Another advantage of reducing or suppressing the fluctuation in the reference level of the touch detection signal is that even if two peaks are produced, one being greater and the other smaller than the reference level, the upward peak can have a sufficient height and the downward peak a sufficient depth from the reference level to widen the dynamic range of the peak amplitude.

While the present invention has been described above with reference to the preferred embodiment of providing four capacitors $C_1$–$C_4$, it should be noted that more than four capacitors may be connected in parallel and chosen as appropriate for addition of capacitance. In the preferred embodiment, connection of the four capacitors is switched to choose an appropriate value for the capacitance to be added to the inputs of differential current generator circuit 15. Needless to say, only two capacitors $C_1$ and $C_2$ may be employed in the present invention.

What is claimed is:

1. A touch detection signal generating circuit which scans electrodes arranged in specified directions in an electrostatic sensor portion and receives a charge current obtained from each electrode to generate a detection signal that represents the touching of a specified electrode, said circuit further including:

an amplifier that is connected to the electrostatic sensor portion via a first switching circuit and which receives said charge current at the input terminal to generate said touch detection signal as an output current;

an offset cancelling circuit which cancels an offset in the output of said amplifier by setting the output terminal of said amplifier at a specified reference level and adjusting said output current to substantially zero when said amplifier is supplied with no signal; and a capacitance adding circuit which is provided between said electrostatic sensor portion and said input terminal of said amplifier and by which a capacitance equivalent to the input capacitance of said input terminal of said amplifier for the case where it is connected to said electrostatic sensor portion by means of said first switching circuit is added to the input terminal of said amplifier via a second switching circuit;

wherein said offset cancelling circuit cancels an offset in the output of said amplifier with said electrostatic sensor portion being disconnected from said amplifier by means of said first switching circuit and with said capacitance being added to the input terminal of said amplifier by means of said second switching circuit.

2. The touch detection signal generating circuit according to claim 1, wherein said first switching circuit is turned on to connect said electrostatic sensor portion to said amplifier and turned off to disconnect said electrostatic sensor portion from said amplifier, said capacitance adding circuit has a capacitor of the capacitance equivalent to said input capacitance, said second switching circuit is connected at an end to said input terminal and connected at the other end to said capacitor, said second switching circuit being turned on to have said capacitor added at the input terminal of said amplifier and turned off to disconnect said capacitor from the input terminal of said amplifier.

3. The touch detection signal generating circuit according to claim 2, wherein said capacitor is provided between said second switching circuit and the ground, and after the offset in the output of said amplifier has been cancelled by said offset cancelling circuit, said second switching circuit is turned off to disconnect said capacitor from said input terminal and said first switching circuit is turned on to connect said electrostatic sensor portion to said amplifier, whereupon said scan of electrodes is initiated.

4. The touch detection signal generating circuit according to claim 3, wherein said first switching circuit has two switching circuits, said amplifier has a (+) phase input terminal and a (−) phase input terminal, said scan of electrodes being based on a pair of adjacent electrodes that are scanned as a set, each of the capacitors formed of each electrode pair generating two charge currents, one of which is supplied to said (+) phase input terminal via one of said two switching circuits and the other being supplied to said (−) phase input terminal via the other of said two switching circuits.

5. The touch detection signal generating circuit according to claim 4, wherein said capacitor in said capacitance adding circuit has a plurality of capacitors which are selectively added at the (+) and (−) phase input terminals of said amplifier.

6. The touch detection signal generating circuit according to claim 5, wherein said second switching circuit also has two switching circuits, said plurality of capacitors in said capacitance adding circuit are a first and a second capacitor which correspond to said (+) phase input terminal and said (−) phase input terminal, respectively, and have capacitances equivalent to said input capacitances of these input terminals, said first capacitor being connected to said (+) phase input terminal via one of the two switching circuits in said second switching circuit whereas said second capacitor is connected to said (−) phase input terminal via the other switching circuit in said second switching circuit.

7. The touch detection signal generator circuit according to claim 6, wherein said amplifier is a push-pull amplifier which has a variable current source serving as a current discharger provided upstream in the push circuit and has another variable current source serving as a current sink provided downstream in the pull circuit, a capacitor for integrating output current values being connected to the output terminal of said amplifier, and said offset cancelling circuit cancels an offset in the output of said amplifier by adjusting the current values of said two variable current sources.

8. The touch detection signal generator circuit according to claim 7, which further includes a multiplexer provided between said electrostatic sensor portion and said first switching circuit for scanning said pair of adjacent electrodes as a set, with a pulse being applied to a selected pair of adjacent electrodes, said touch detection signal generator circuit further including a connection switching circuit provided between said first switching circuit and said amplifier for interchanging the connection to said (+) phase input terminal with the connection to said (−) phase input terminal, said connection switching circuit fulfilling its function by causing said charge current to have the same polarity at the rise and fall of said pulse.

9. The touch detection signal generating circuit according to claim 8, wherein said electrostatic sensor portion has a multiple of X electrodes arranged in a grid pattern in the X direction and a multiple of Y electrodes arranged in a grid pattern in the Y direction, said multiplexer first scanning either said X electrodes or said Y electrodes, then scanning said Y electrodes or said X electrodes.

10. A locator device which scans electrodes arranged in specified directions in an electrostatic sensor portion and receives a charge current obtained from each electrode to generate a detection signal that represents the touching of a specified electrode and on the basis of which the position of the touched electrode is detected, comprising a touch detection signal generating circuit, said circuit further including:
an amplifier that receives said charge current at the input terminal to generate said touch detection signal as an output current;
a first switching circuit which is turned on to connect said electrostatic sensor portion to said amplifier and turned off to disconnect said electrostatic sensor portion from said amplifier;
an offset cancelling circuit which cancels an offset in the output of said amplifier by setting the output terminal of said amplifier at a specified reference level and adjusting the output current to substantially zero when said amplifier is supplied with no signal; and
a capacitance adding circuit which has a second switching circuit and is provided between said electrostatic sensor portion and said input terminal of said amplifier and by which a capacitance equivalent to the input capacitance of said input terminal of said amplifier for the case where it is connected to said electrostatic sensor portion is added to the input terminal of said amplifier via said second switching circuit as it has been turned on; and
a control circuit which turns off said first switching circuit and turns on said second switching circuit to cancel an offset in the output of said amplifier by means of said offset cancelling circuit and which then turns off said second switching circuit and turns on said first switching circuit to control said scanning of electrodes.

11. The locator device according to claim 10, wherein said capacitance adding circuit has a capacitor of the capacitance equivalent to said input capacitance, said second switching circuit is connected at an end to said input terminal and connected at the other end to an end of said capacitor, the other end of said capacitor being grounded.

12. The locator device according to claim 11, wherein said first switching circuit has two switching circuits, said amplifier has a (+) phase input terminal and a (−) phase input terminal, said scan of electrodes being based on a pair of adjacent electrodes that are scanned as a set, each of the capacitors formed of each electrode pair generating two charge currents, one of which is supplied to said (+) phase input terminal via one of said two switching circuits and the other being supplied to said (−) phase input terminal via the other of said two switching circuits.

13. The locator device according to claim 12, wherein said capacitor in said capacitance adding circuit has a plurality of capacitors, said capacitance adding circuit selectively adding at least one of said capacitors in accordance with a control signal, said control circuit being such that when said detection signal fails to determine if any electrode has been touched or when the position of a touched electrode cannot be detected, it generates said control signal and controls said capacitance adding circuit to add another value of capacitance to said input terminal.

14. In a locator device having an electrostatic sensor portion comprising a multiple of X electrodes arranged in a grid pattern in the X direction and a multiple of Y electrodes arranged in a grid pattern in the Y direction, said locator device scanning said electrodes with a pair of adjacent ones taken as a set to generate a detection signal in correspondence with each pair of said X or Y electrodes which varies in signal level along the scan direction to have two peaks centering at the touch position, one being greater and the other smaller than a specified reference level, said locator device thus detecting the position of any of the touched X and Y electrodes, the improvement wherein said locator device further includes:

an amplifier that is connected to said electrostatic sensor portion via a first switching circuit and which receives a charge current at the input terminal to generate said touch detection signal as an output current;

an offset cancelling circuit which cancels an offset in the output of said amplifier by setting the output terminal of said amplifier at a specified reference level and adjusting the output current to substantially zero when said amplifier is supplied with no signal;

a capacitance adding circuit which is provided between said electrostatic sensor portion and said input terminal of said amplifier and by which a capacitance equivalent to the input capacitance of said input terminal of said amplifier for the case where it is connected to said electrostatic sensor portion by means of said first switching circuit is added to the input terminal of said amplifier via a second switching circuit; and a control circuit which controls said first switching circuit to become off so that said electrostatic sensor portion is disconnected from said amplifier and which controls said second switching circuit to become on so that the capacitance equivalent to said input capacitance is added to the input terminal of said amplifier by means of said capacitance adding circuit to cancel an offset in the output of said amplifier by means of said offset cancelling circuit and which controls said second switching circuit to become off so that the capacitance equivalent to said input capacitance is isolated from said input terminal and which controls said first switching circuit to become on so that said electrostatic sensor portion is connected to said amplifier and said scanning of electrodes is controlled.

15. A method of generating touch detection signals which scans electrodes arranged in specified directions in an electrostatic sensor portion and which receives a charge current obtained from each electrode to generate a detection signal that represents the touching of a specified electrode, said method including:

an amplifier that is connected to said electrostatic sensor portion and which receives said charge current at the input terminal to generate said touch detection signal as an output current; and an offset cancelling circuit which cancels an offset in the output of said amplifier by setting the output terminal of said amplifier at a specified reference level and adjusting said output current to substantially zero when said amplifier is supplied with no signal;

wherein after said electrostatic sensor portion is disconnected from said input terminal of said amplifier, a capacitance equivalent to the input capacitance of said amplifier for the case where said electrostatic sensor portion is connected to said input terminal is added to said input terminal, whereby said offset cancelling circuit cancels an offset in the output of said amplifier and thereafter said added capacitance is isolated from said input terminal and said electrostatic sensor portion is connected to said input terminal of said amplifier and thereafter said scanning of electrodes is performed to obtain said detection signal.

* * * * *